(12) United States Patent
Yamamoto et al.

(10) Patent No.: US 8,299,891 B2
(45) Date of Patent: Oct. 30, 2012

(54) ANTITHEFT SYSTEM FOR VEHICLE

(75) Inventors: Naoto Yamamoto, Utsunomiya (JP); Hideaki Arai, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 426 days.

(21) Appl. No.: 12/449,205

(22) PCT Filed: Jan. 23, 2008

(86) PCT No.: PCT/JP2008/050886
§ 371 (c)(1),
(2), (4) Date: Jul. 28, 2009

(87) PCT Pub. No.: WO2008/111329
PCT Pub. Date: Sep. 18, 2008

(65) Prior Publication Data
US 2010/0052845 A1    Mar. 4, 2010

(30) Foreign Application Priority Data

Mar. 13, 2007 (JP) ................................ 2007-063833

(51) Int. Cl.
  *G06F 7/04* (2006.01)
  *H04L 9/14* (2006.01)
  *H04L 9/32* (2006.01)
  *E05B 65/36* (2006.01)

(52) U.S. Cl. .. 340/5.26; 340/5.64; 340/5.8; 340/426.11; 307/10.1

(58) Field of Classification Search ............. 70/256; 235/487, 494; 307/10.1–10.5; 340/5.2–5.26, 340/5.6–5.64, 425.5–426.1, 426.11, 426.13–426.17
See application file for complete search history.

(56) References Cited

U.S. PATENT DOCUMENTS

| | | | | |
|---|---|---|---|---|
| 4,970,504 A | * | 11/1990 | Chen | 340/5.26 |
| 5,365,225 A | * | 11/1994 | Bachhuber | 340/5.26 |
| 5,420,925 A | * | 5/1995 | Michaels | 380/262 |
| 5,506,905 A | * | 4/1996 | Markowski et al. | 380/262 |
| 5,563,600 A | * | 10/1996 | Miyake | 341/173 |

(Continued)

FOREIGN PATENT DOCUMENTS

EP    0 774 673 A2    5/1997

(Continued)

OTHER PUBLICATIONS

European Patent Office search report ref: 45909PEPWO dated Mar. 2, 2011, for application # EP 08 70 3721.

*Primary Examiner* — Benjamin C Lee
*Assistant Examiner* — Stephen Burgdorf
(74) *Attorney, Agent, or Firm* — Carrier Blackman & Associates, P.C.; Joseph P. Carrier; William D. Blackman

(57) ABSTRACT

In a keyless entry system, a CPU in an ECU and a CPU in a remote control key each have an associated memory for storing respective function formulas, which are specified by primary function formula data. With this structure, function formulas used in the remote control key and the ECU can be changed to respective new function formulas. This technique makes it difficult to predict the function formulas used in the remote control key and the ECU, thereby further reducing any regularity of rolling codes generated by the function formulas.

5 Claims, 8 Drawing Sheets

U.S. PATENT DOCUMENTS

| | | | |
|---|---|---|---|
| 5,600,324 A * | 2/1997 | Reed et al. | 341/176 |
| 5,631,962 A * | 5/1997 | Balph et al. | 713/170 |
| 5,708,307 A * | 1/1998 | Iijima et al. | 307/10.5 |
| 5,774,065 A | 6/1998 | Mabuchi et al. | |
| 5,844,990 A | 12/1998 | Kokubu et al. | |
| 5,973,411 A | 10/1999 | Tado et al. | |
| 6,144,112 A * | 11/2000 | Gilmore | 307/10.2 |
| 6,154,544 A * | 11/2000 | Farris et al. | 380/262 |
| 6,181,252 B1 | 1/2001 | Nakano | |
| 6,225,889 B1 | 5/2001 | Furuta et al. | |
| 7,589,613 B2 * | 9/2009 | Kraft | 340/5.26 |
| 2004/0056776 A1 * | 3/2004 | Tsuji et al. | 340/825.72 |
| 2006/0198523 A1 * | 9/2006 | Shearer | 380/270 |
| 2006/0223500 A1 | 10/2006 | Osugi et al. | |
| 2007/0001805 A1 * | 1/2007 | Utter et al. | 340/5.72 |
| 2008/0122594 A1 * | 5/2008 | Brecht et al. | 340/426.11 |

FOREIGN PATENT DOCUMENTS

| | | |
|---|---|---|
| JP | 01-278671 | 11/1989 |
| JP | 08-102982 | 4/1996 |
| JP | 08-182076 | 7/1996 |
| JP | 10-61277 | 3/1998 |
| JP | 2006-306379 | 11/2006 |

* cited by examiner

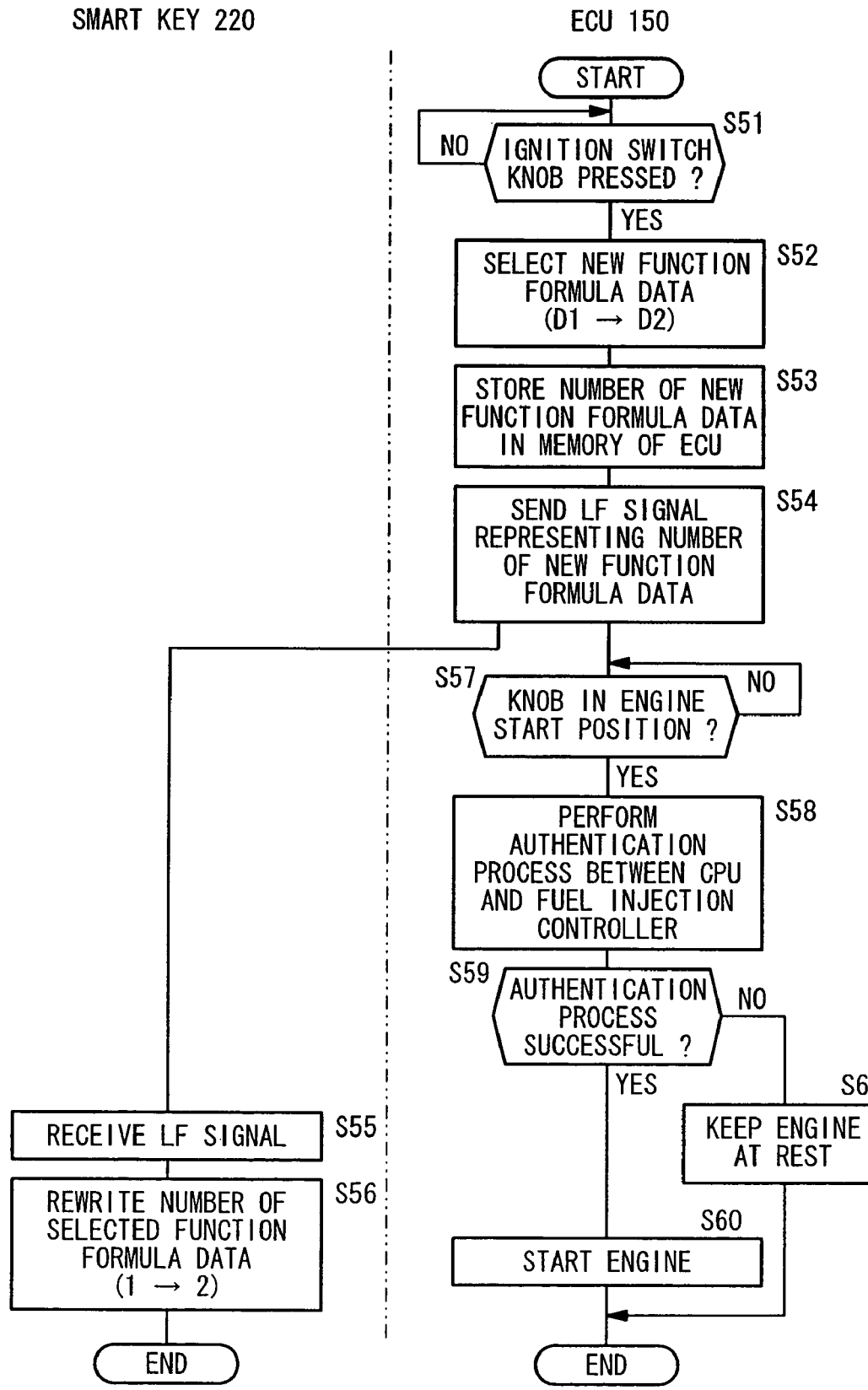

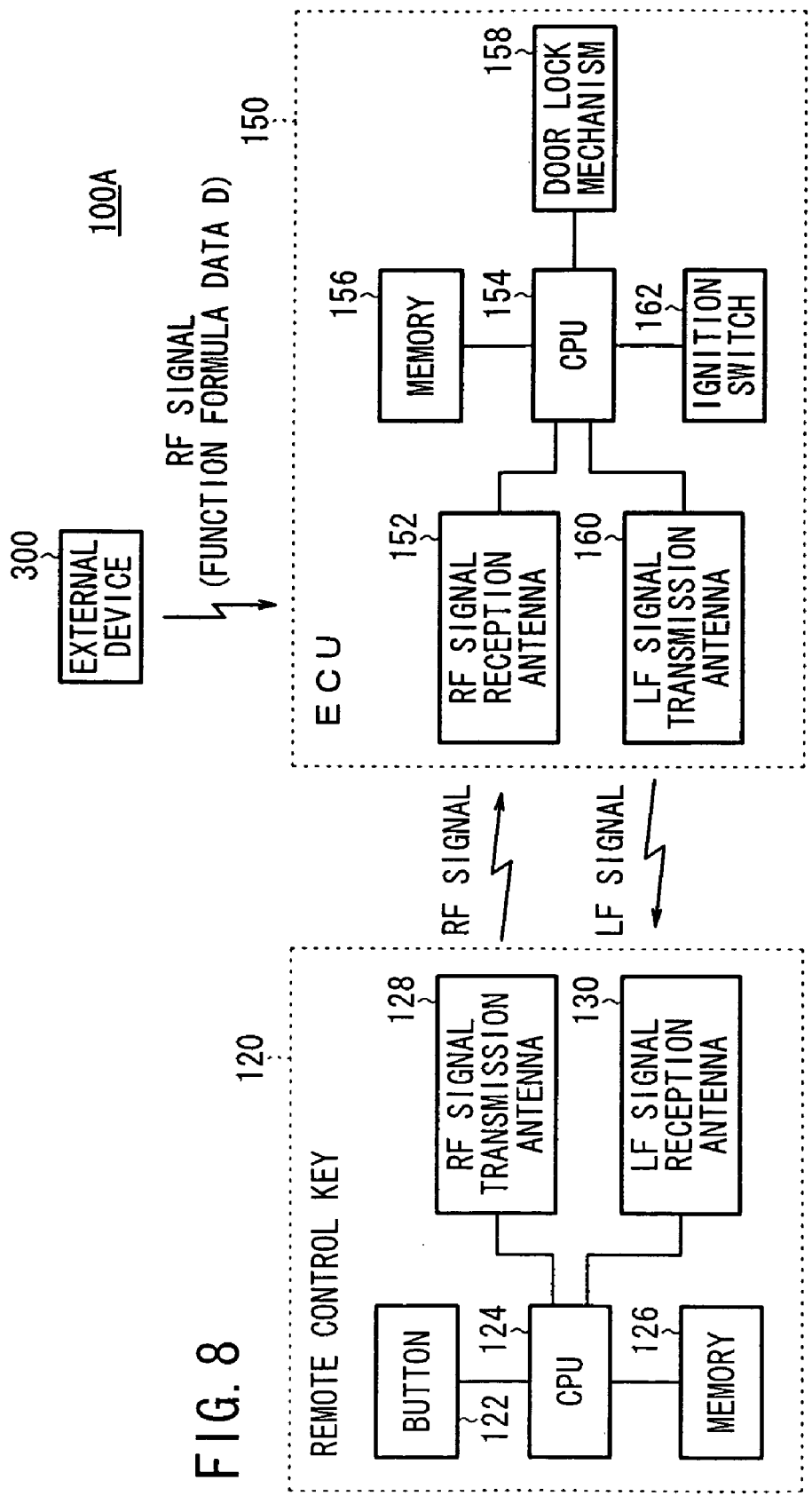

ANTITHEFT SYSTEM FOR VEHICLE

TECHNICAL FIELD

The present invention relates to a vehicle theft prevention system (antitheft system for vehicle), such as a keyless entry system, a smart entry system, or a smart start system, for permitting vehicle-mounted equipment to be operated, e.g., for permitting doors to be locked and unlocked, or permitting an engine to be started, based on an authentication code sent from a portable device.

BACKGROUND ART

Heretofore, vehicle theft prevention systems, such as a keyless entry system, a smart entry system, a smart start system, etc. have been employed for the purpose of preventing vehicles from being stolen.

The keyless entry system and the smart entry system refer to a system for locking and unlocking vehicle doors based on wireless communications between a portable device and a vehicle-mounted authenticating device without the need for inserting a key into a cylinder that is mounted in the door.

According to the keyless entry system, when the user presses a button on the portable device, the portable device sends an authentication code to the vehicle-mounted authenticating device, which checks the authentication code against a reference code stored in the vehicle-mounted authenticating device. If the check result satisfies a given condition, e.g., if the authentication code and the reference code are in full agreement with each other, then the doors are locked or unlocked.

According to the smart entry system, when a trigger condition is satisfied, e.g., when the user touches a door handle of the vehicle, the vehicle-mounted authenticating device sends a signal for requesting an authentication code to the portable device. In response to the request signal, the portable device sends the authentication code to the vehicle-mounted authenticating device, which checks the authentication code against a reference code stored in the vehicle-mounted authenticating device. If the check result satisfies a given condition, e.g., if the authentication code and the reference code are in full agreement with each other, then the doors are locked or unlocked. The smart entry system makes it possible to lock and unlock the doors though the user does not operate a button on the portable device.

The smart start system refers to a system for permitting an engine to be started based on wireless communications between a portable device and a vehicle-mounted authenticating device without the need for inserting a key into a cylinder. According to the smart start system, when the driver turns an ignition knob, the vehicle-mounted authenticating device sends a signal for requesting an authentication code to the portable device. In response to the request signal, the portable device sends the authentication code to the vehicle-mounted authenticating device, which checks the authentication code against a reference code stored in the vehicle-mounted authenticating device. If the check result satisfies a given condition, e.g., if the authentication code and the reference code are in full agreement with each other, then the engine is permitted to start.

In each of the above systems, as described above, wireless communications take place between the portable device and the vehicle-mounted authenticating device. If the signal sent from the portable device to the vehicle-mounted authenticating device is of a fixed content, then when the signal from the portable device is intercepted by a third party and the third party separately sends an identical signal to the vehicle-mounted authenticating device, the vehicle-mounted authenticating device misidentifies the signal as being sent from the portable device, and permits the vehicle doors to be unlocked. As a result, the vehicle may possibly be stolen.

One of the technologies developed to reduce the above possibility is a rolling code (see Japanese Laid-Open Patent Publication No. 01-278671, Japanese Laid-Open Patent Publication No. 08-102982, and Japanese Laid-Open Patent Publication No. 10-061277). The rolling code is a code that is regularly renewed each time wireless communications take place from the portable device to the vehicle-mounted authenticating device. For example, a rolling code that is renewed according to a function formula: $f(n+1)=f(n)+1$ is incremented by 1 for each wireless communications session, and hence is changed at all times. The function formula and the preceding rolling code are stored in the portable device and the vehicle-mounted authenticating device. Even if a signal from the portable device is intercepted and an identical signal is sent to the vehicle-mounted authenticating device, the vehicle-mounted authenticating device does not permit the doors to be unlocked because the received signal is different from the value of the appropriate rolling code.

With the keyless entry system, for example, the button on the portable device may be pressed when the portable device is so away from the vehicle-mounted authenticating device that no wireless communications are possible therebetween, or an unexpected communication error may happen. Thus, the vehicle-mounted authenticating device not only authenticates a received signal which is the same as the value of the appropriate rolling code, but also authenticates a received signal with a certain degree of latitude. For example, if the value of the appropriate rolling code is 100, then a signal having a value in the range from 100 to 120 is judged as a rolling code sent from an authentic portable device, and the doors are permitted to be unlocked.

Various attempts have been made to increase the security of the rolling code.

According to Japanese Laid-Open Patent Publication No. 08-102982, a fixed ID code and a variable rolling code are not sent as separate bits, but an ID code is varied depending on a rolling code. Since the ID code itself is variable, fixed portions are reduced for increased security.

According to Japanese Laid-Open Patent Publication No. 10-061277, a key code inherent in the vehicle which the designer is not informed of is used to encrypt a rolling code for increased security.

DISCLOSURE OF THE INVENTION

However, insofar as wireless communications take place between the portable device and the vehicle-mounted authenticating device, the communication signal is always susceptible to the danger of being intercepted. Therefore, technologies of higher security are being sought at all times.

The present invention has been made in view of the above problems. It is an object of the present invention to provide a vehicle theft prevention system which is of higher security.

A vehicle theft prevention system according to the present invention includes a portable device for sending an authentication code renewed by a first function formula, the portable device having a first storage unit for storing the authentication code and first function formula data defining the first function formula for renewing the authentication code, a vehicle-mounted authenticating device for receiving the authentication code, checking the authentication code against a reference code, and controlling operation of vehicle-mounted equipment depending on a result of the check, wherein the vehicle-mounted authenticating device has a second storage unit for storing the reference code and second function formula data defining a second function formula for renewing the reference code, the second function formula being identical to the first function formula, and checks the received authentication code against the reference code renewed by the second function formula, and a function formula changing unit for changing the first function formula defined by the first function formula data stored in the first storage unit to a new first function formula and changing the second function formula defined by the second function formula data stored in the second storage unit to a new second function formula.

According to the present invention, the first function formula and the second function formula used by the portable device and the vehicle-mounted authenticating device can be changed respectively to a new first function formula and a new second function formula. Since it is hard to predict the function formulas used by the portable device and the vehicle-mounted authenticating device, the security of the vehicle theft prevention system is increased.

The first storage unit may store a plurality of first function formula data defining a plurality of first function formulas which are different from each other, and the second storage unit may store a plurality of second function formula data defining a plurality of second function formulas which are identical to the plurality of first function formulas defined by the plurality of first function formula data. The vehicle-mounted authenticating device may send an identifier indicative of which one of the plurality of first function formula data is to be selected to the portable unit, and the portable unit may select the first function formula data based on the identifier.

For changing the first function formula in the portable device, the vehicle-mounted authenticating device may send only the identifier of first function formula data, but not second function formula data themselves for use as first function formula data, to the portable device. Therefore, the amount of data transmitted from the vehicle-mounted authenticating device to the portable device is reduced for speeding up communications. As only the identifier is sent to the portable device, the possibility that the content of the second function formula data will leak out is lower than if the second function formula data themselves were sent, so that the security of the vehicle theft prevention system is increased.

Alternatively, the first storage unit may store only one of the first function formula data defining the first function formula, the second storage unit may store a plurality of second function formula data defining a plurality of second function formulas which are different from each other. The vehicle-mounted authenticating device may read second function formula data defining a new second function formula which is different from the first function formula defined by the first function formula data stored in the first storage unit, from the second storage unit, and send the second function formula data to the portable device, and the portable device may store the received second function formula data as new first function formula data, and use a new first function formula defined by the new first function formula data for a next renewal of the authentication code.

Therefore, the first storage unit of the portable device stores only one of the first function formula data at all times. The first storage unit may thus have a smaller storage capacity and hence a smaller size. As a result, the portable device may be reduced in size.

The vehicle theft prevention system should preferably have a new second function formula data supply unit, disposed outside of the vehicle, for supplying new second function formula data defining a new second function formula to the second storage unit of the vehicle-mounted authenticating device by way of wireless communications.

It is thus possible to renew, from outside of the vehicle, the second function formula data stored in the second storage unit and the first function formula data stored in the first storage unit based on the second function formula data. The first function formula data and the second function formula data can thus easily be renewed for making the vehicle theft prevention system more secure.

The changed new first function formula and second function formula may be selected based on a random code which is randomly generated by the vehicle-mounted authenticating device. Alternatively, the changed new first function formula and second function formula may be selected based on a measured value from a measuring instrument on the vehicle.

By thus selecting the first function formula and the second function formula according to the above processes, the selection of the first function formula and the second function formula is made less recognizable from outside of the vehicle, and the security of the vehicle theft prevention system is further increased.

BRIEF DESCRIPTION OF THE DRAWINGS

FIG. 7 is a flowchart of a sequence for changing function formulas for renewing a rolling code and starting an engine, of the smart key system according to the second embodiment; and FIG. 8 is a block diagram of a modification of the present invention.

BEST MODE FOR CARRYING OUT THE INVENTION

Embodiments of the present invention will be described below with reference to the drawings.

A. First Embodiment

Keyless Entry System

Figure 1:
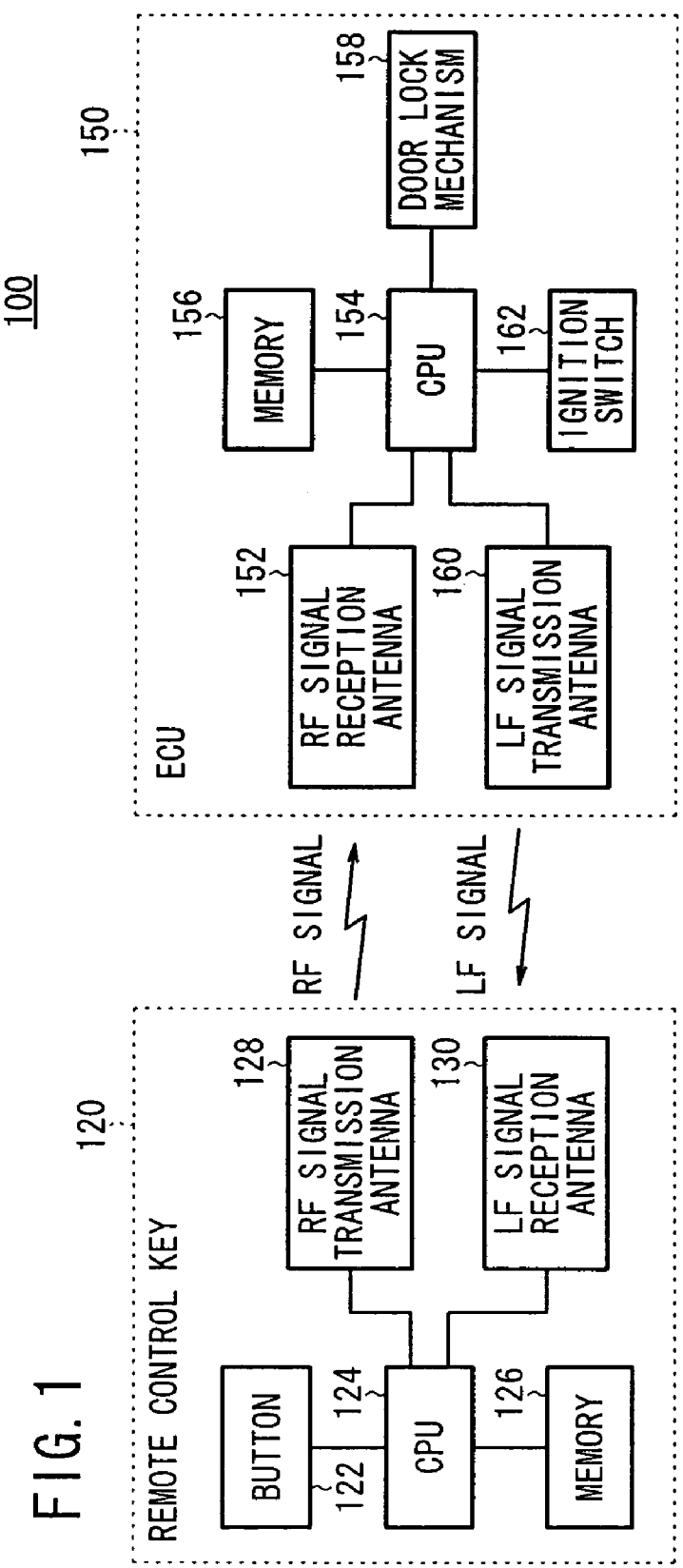
FIG. 1 is a block diagram of a keyless entry system according to a first embodiment of the present invention.

1. System Configuration:

FIG. 1 shows a keyless entry system 100 according to a first embodiment of the present invention. The keyless entry system 100 comprises a remote control key 120 (portable device) and an ECU (Electronic Control Unit) 150 (vehicle-mounted authenticating device) which is paired with the remote control key 120.

The remote control key 120 has a button 122, a CPU 124, a memory 126, an RF signal transmission antenna 128, and an LF signal reception antenna 130.

The button 122 is pressed for the user to lock and unlock vehicle doors (not shown), and comprises a normally open push button. The button 122 is connected to the CPU 124. When the button 122 is pressed, it outputs a signal to the CPU 124.

The CPU 124 is connected to the memory 126, the RF signal transmission antenna 128, and the LF signal reception antenna 130, in addition to the button 122. The CPU 124 controls overall operation of the remote control key 120. The functions of the CPU 124 will be described in detail later.

The memory 126 stores therein data representing a vehicle identification code (ID code) $C_{ID}$, a rolling code R, and function formula data D which define a function formula F for renewing the rolling code R. The memory 126 should preferably be a nonvolatile memory such as an EEPROM (Erasable Programmable ROM), a flash memory, or the like. In the present embodiment, first function formula data D1 which define a first function formula F1 as one of function formulas F are stored in the memory 126.

The RF signal transmission antenna 128 includes an RF signal generating circuit for generating a high-frequency signal (RF signal) of 315 [MHz], and sends an RF signal to the ECU 150.

The LF signal reception antenna 130 includes an LF signal processing circuit for processing a low-frequency signal (LF signal) of 125 [kHz], and receives an LF signal sent from the ECU 150.

The ECU 150 comprises an RF signal reception antenna 152, a CPU 154, a memory 156, a door lock mechanism 158, an LF signal transmission antenna 160, and an ignition switch 162.

The RF signal reception antenna 152 includes an RF signal processing circuit for processing an RF signal, and receives an RF signal sent from the remote control key 120.

The CPU 154 is connected to the RF signal reception antenna 152, the memory 156, the door lock mechanism 158, the LF signal transmission antenna 160, and the ignition switch 162. The CPU 154 controls overall operation of the ECU 150. The functions of the CPU 154 will be described in detail later.

The memory 156 stores therein data representing the vehicle ID code $C_{ID}$, the rolling code R, a plurality of function formula data D which define a plurality of function formulas F for renewing the rolling code R, and the number of currently selected function formula data D. The memory 156 should preferably be a nonvolatile memory such as an EEPROM, a flash memory, or the like. In the present embodiment, first function formula data D1, second function formula data D2, and third function formula data D3 which define function formulas F1, F2, F3 as a plurality of function formulas F are stored in the memory 156. Also, the number "1" representing the first function formula data D1 is stored in the memory 156 as the number of the currently selected function formula data D. The first function formula data D1 stored in the memory 156 of the ECU 150 is identical to the first function formula data D1 stored in the memory 126 of the remote control key 120.

The door lock mechanism 158 locks and unlocks the vehicle doors (not shown) according to a command from the CPU 154.

The LF signal transmission antenna 160 includes an LF signal generating circuit for generating an LF signal, and sends an LF signal to the remote control key 120.

The ignition switch 162 is integrally combined with a cylinder into which the remote control key 120 is inserted. When the remote control key 120 which is inserted into the cylinder is turned, the ignition switch 162 allows an accessory such as a radio receiver or the like to be used or allows an engine to be started depending on the position of the remote control key 120.

Figure 2:
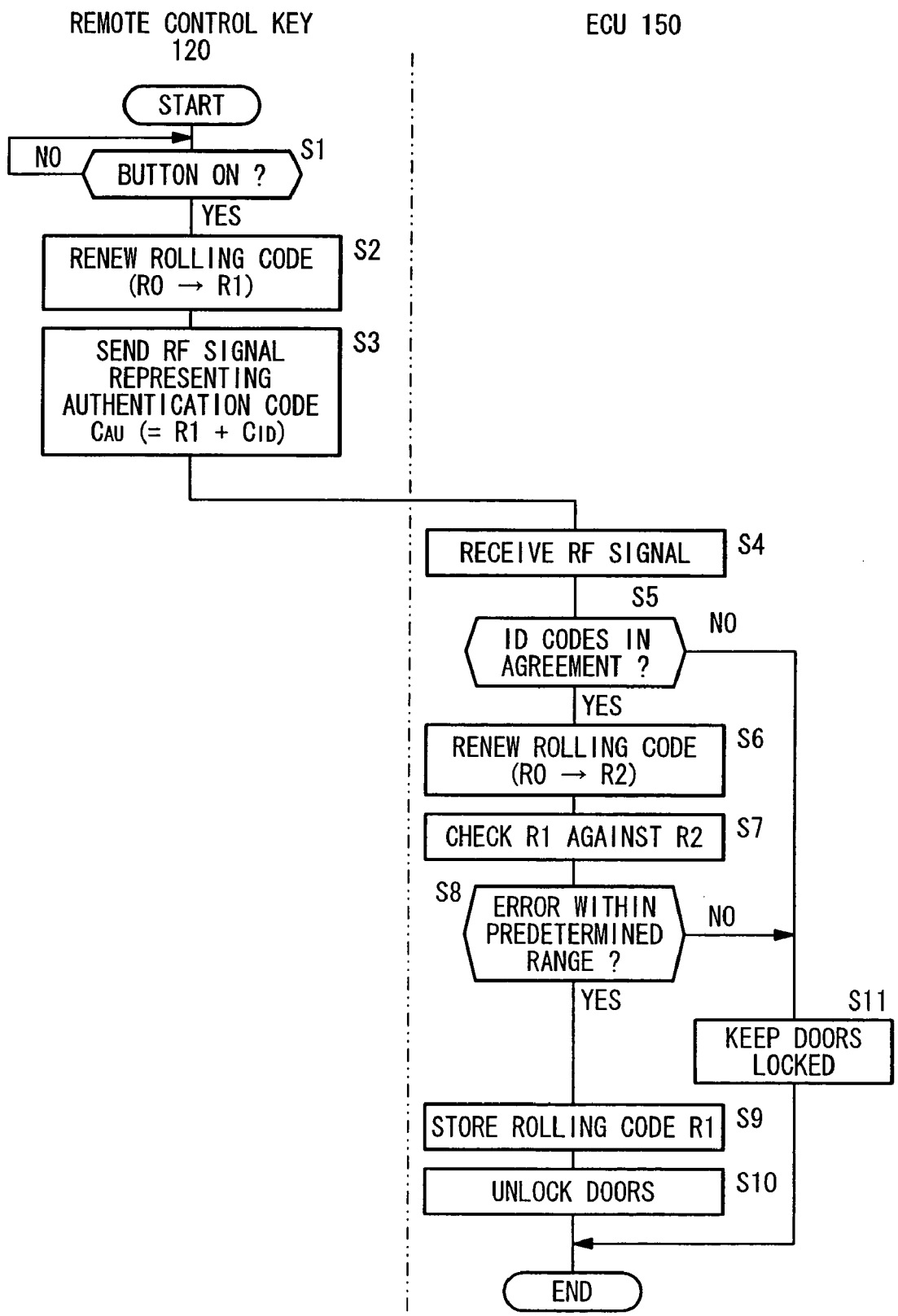
FIG. 2 is a flowchart of a sequence for unlocking vehicle doors, of the keyless entry system according to the first embodiment.

2. Door Unlocking Flow:

FIG. 2 shows a flowchart of a sequence for unlocking vehicle doors (not shown), of the keyless entry system 100 according to the first embodiment.

In step S1, the CPU 124 detects when the button 122 on the remote control key 120 is pressed by the user. In step S2, the CPU 124 reads an authentication code $C_{AU}$ that is made up of the ID code $C_{ID}$ of the vehicle and the rolling code R (a previously used rolling code R0) from the memory 126, and renews the previous rolling code R0 into a new rolling code R1 according to the function formula F1. The function formula F1 is defined as $F1(n+1)=F1(n)+1$, for example. In other words, each time the button 122 is pressed, the value of the rolling code is incremented by 1. The new rolling code R1 is stored instead of the previous rolling code R0 in the memory 126.

In step S3, the CPU 124 sends an RF signal which represents the authentication code $C_{AU}$ made up of the ID code $C_{ID}$ of the vehicle and the rolling code R1, from the RF signal transmission antenna 128.

In step S4, the RF signal reception antenna 152 of the ECU 150 receives the RF signal sent from the remote control key 120. In step S5, the CPU 154 reads the ID code $C_{ID}$ of the vehicle from the RF signal, and checks it against the ID code $C_{ID}$ of the vehicle which is stored in the memory 156. If the ID code $C_{ID}$ of the vehicle included in the RF signal and the ID code $C_{ID}$ stored in the memory 156 are in agreement with each other, then control goes to step S6. If not in agreement with each other, then the CPU 154 finishes its processing sequence in step S11, keeping the doors locked.

In step S6, the CPU 154 renews the rolling code R (the previously used rolling code R0) stored in the memory 156 into a new rolling code R2 according to the function formula F1.

In step S7, the CPU 154 checks the rolling code R1 against the rolling code R2. If any error between the rolling code R1 and the rolling code R2 falls within a predetermined range in step S8, then the CPU 154 renews and stores the rolling code R1 received from the remote control key 120 in the memory 156. That any error falls within the predetermined range means that the rolling code R1 is different from the rolling code R2 by a range from 0 to +10, in view of an invalid pressing by the user of the button 122 on the remote control key 120, for example.

In step S10, the CPU 154 sends a command to the door lock mechanism 158 to unlock the vehicle doors (not shown). According to the command, the door lock mechanism 158 unlocks the vehicle doors.

If any error between the rolling code R1 and the rolling code R2 does not fall within the predetermined range in step S8, then the CPU 154 does not send a command to the door lock mechanism 158 to unlock the vehicle doors, which remain locked.

The process of unlocking the doors has been described above. However, a process of locking the doors can similarly be performed.

Figure 3:
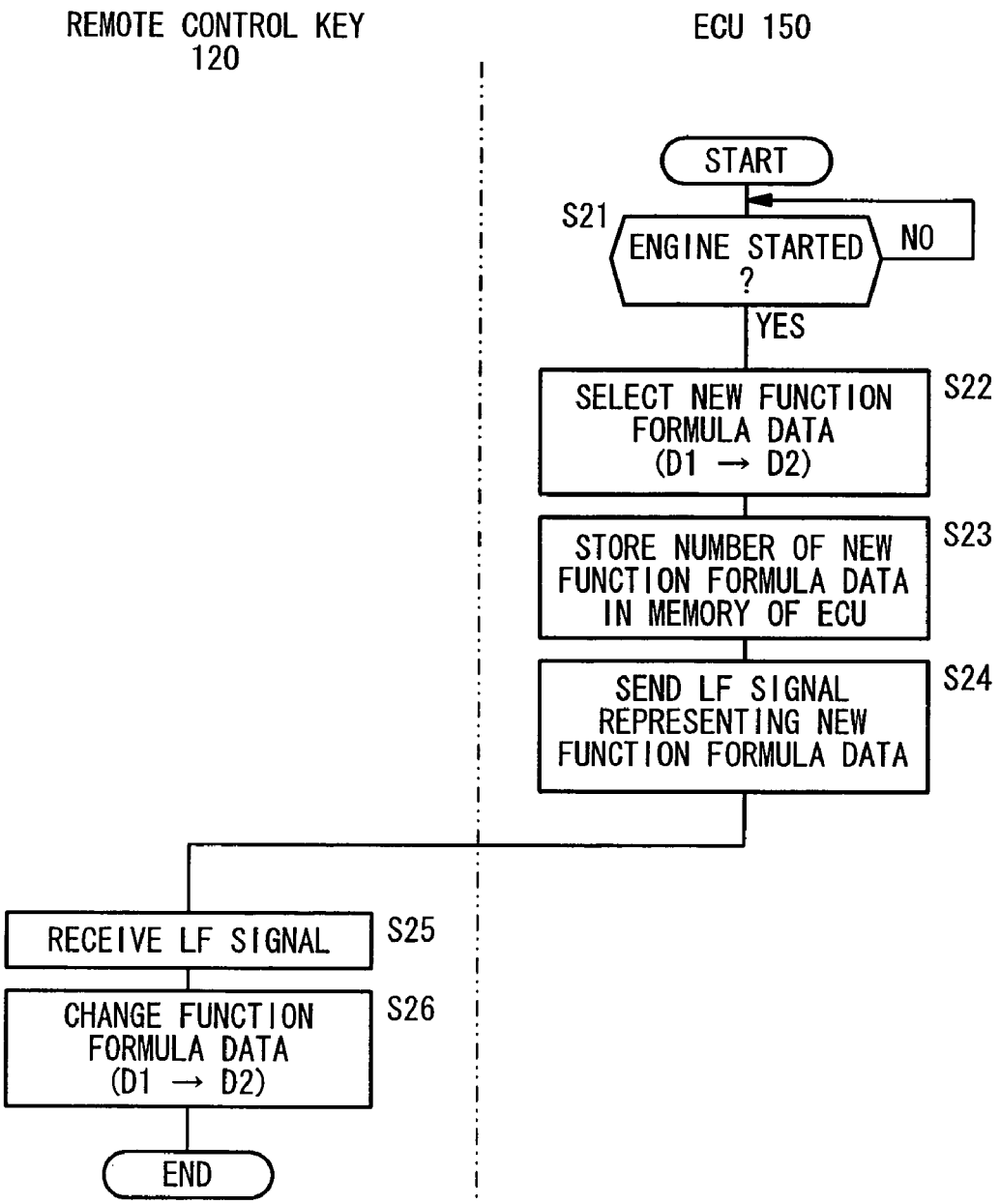
FIG. 3 is a flowchart of a sequence for changing function formulas for renewing a rolling code, of the keyless entry system according to the first embodiment.

3. Function Formula Changing Flow:

FIG. 3 shows a flowchart of a sequence for changing function formulas F used by the remote control key 120 and the ECU 150.

In step S21, the CPU 154 of the ECU 150 detects when the remote control key 120 which is inserted into the cylinder of the ignition switch 162 is turned to the position of engine start, based on a signal from the ignition switch 162.

In step S22, the CPU 154 selects function formula data D other than the first function formula data D1, i.e., the second function formula data D2 or the third function formula data D3. It is assumed for illustrative purpose that the CPU 154 selects the second function formula data D2. The function formula F2 represented by the second function formula data D2 is defined as $F2(n+1)=F2(n)+100$, for example, and the function formula F3 represented by the third function formula data D3 is defined as $F3(n+1)=F3(n)-50$, for example. In step S23, the CPU 154 rewrites the number of the currently selected function formula data D in the memory 156 from the number "1" representing the first function formula data D1 into the number "2" representing the second function formula data D2.

In step S24, the CPU 154 reads the second function formula data D2 from the memory 156, and sends the second function formula data D2 through the LF signal transmission antenna 160 to the remote control key 120.

In step S25, the CPU 124 of the remote control key 120 receives the second function formula data D2 sent from the ECU 150 through the LF signal reception antenna 130. In step S26, the CPU 124 rewrites the function formula data D stored in the memory 126 from the first function formula data D1 into the second function formula data D2.

4. Processes of Selecting Function Formula F:

New function formula data D can be selected in step S22 shown in FIG. 3 by processes to be described below, for example.

(1) Selection Based on Random Variables:

The ECU 150 can be equipped with a random variable generating circuit, and new function formula data D can be selected depending on a random variable output from the random variable generating circuit. For example, the random variable generating circuit is arranged to generate values "1", "2" at random, and the second function formula data D2 are selected if "1" is output and the third function formula data D3 are selected if "2" is output while the first function formula data D1 are currently being selected. Stated otherwise, if "1" is output, then function formula data D having a smaller number are selected, and if "2" is output, then function formula data D having a greater number are selected. Therefore, while the second function formula data D2 are being currently selected, if the random variable is "1", then the first function formula data D1 are selected, and if the random variable is "2", then the third function formula data D3 are selected. Similarly, while the third function formula data D3 are being currently selected, if the random variable is "1", then the first function formula data D1 are selected, and if the random variable is "2", then the second function formula data D2 are selected.

Alternatively, the random variable generating circuit may be arranged to generate random variables "1", "2", "3", and if the random variable is "1", the first function formula data D1 may be selected, if the random variable is "2", the second function formula data D2 may be selected, and if the random variable is "3", the third function formula data D3 may be selected.

(2) Selection Based on Measured Values from Measuring Instruments:

Function formula data D can be selected depending on measured values from measuring instruments such as a battery voltmeter for measuring the voltage value of a battery, a gasoline level meter for measuring a remaining level of gasoline, an odometer for measuring a total traveled distance, a seat position sensor for detecting the position of a seat, etc.

For example, it is assumed that a battery voltmeter is used. If the voltage value of the battery is 13 V or higher, then the first function formula data D1 are selected. If the voltage value of the battery is 12 V or higher and lower than 13 V, then the second function formula data D2 are selected. If the voltage value of the battery is lower than 12 V, then the third function formula data D3 are selected.

5. Advantages of the First Embodiment:

With the keyless entry system 100 according to the first embodiment, the CPU 154 of the ECU 150 and the CPU 124 of the remote control key 120 change the function formula F1 defined by the first function formula data D1 stored in the memory 126 and the function formula F1 defined by the first function formula data D1 stored in the memory 156 to respective new function formulas F2.

With this arrangement, the function formulas F used by the remote control key 120 and the ECU 150 can be changed to respective new function formulas F. Therefore, since it is hard to predict the function formulas F used by the remote control key 120 and the ECU 150, the security of the keyless entry system 100 is increased.

The memory 126 of the remote control key 120 stores only one function formula data D defining a function formula F, and the memory 156 of the ECU 150 stores a plurality of function formula data D defining a plurality of function formulas F. The ECU 150 reads, from the memory 156, second function formula data D2 defining a new function formula F2 which is different from first function formula data D1 stored in the memory 126 of the remote control key 120, and sends the second function formula data D2 to the remote control key 120. The remote control key 120 stores the received second function formula data D2 as new function formula data D, and uses a new function formula F2 defined by the new second function formula data D2 to renew the authentication code $C_{AU}$ for the next time.

Therefore, the memory 126 of the remote control key 120 stores only one function formula data D at all times. The memory 126 may thus have a smaller storage capacity and hence a smaller size. As a result, the remote control key 120 may be reduced in size.

A new function formula F used by the remote control key 120 and the ECU 150 after the function data D have been changed may be selected by a random code that is randomly generated by the ECU 150. Alternatively, a new function formula F may be selected depending on the measured value of a measuring instrument mounted on the vehicle.

By thus selecting function formulas F according to the above processes, the selection of function formulas F is made less recognizable from outside, and the security of the keyless entry system 100 is further increased.

B. Second Embodiment

Smart Key System

Figure 4:
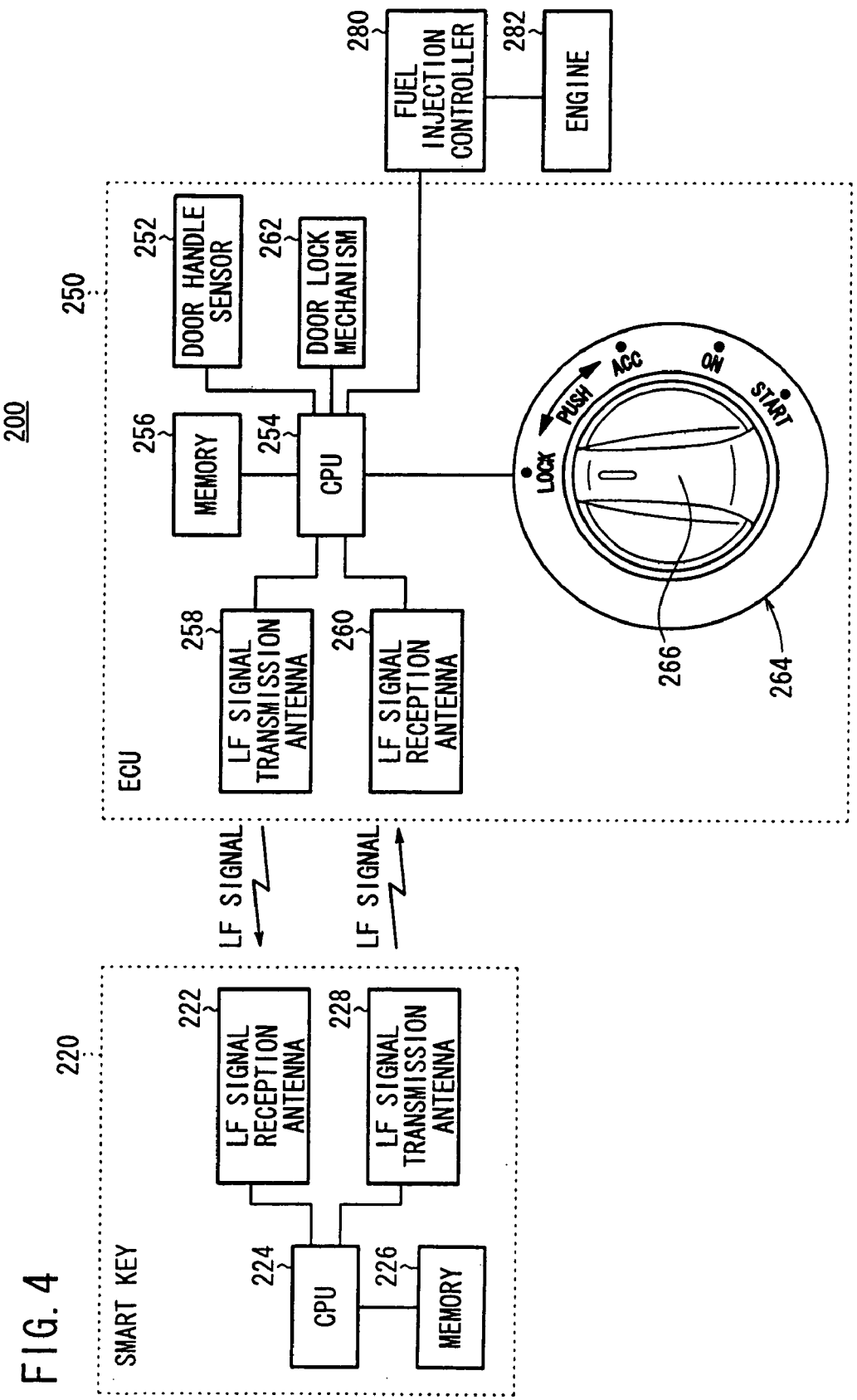
FIG. 4 is a block diagram of a smart key system according to a second embodiment of the present invention.

1. System Configuration:

FIG. 4 shows a smart key system 200 according to a second embodiment of the present invention. The smart key system 200 doubles as a smart entry system and a smart start system, and comprises a smart key 220 (portable device) and an ECU 250 (vehicle-mounted authenticating device) which is paired with the smart key 220.

The smart key 220 has an LF signal reception antenna 222, a CPU 224, a memory 226, and an LF signal transmission antenna 228. The smart key 220 is free of a button such as the button 122 according to the first embodiment. Either of the antennas is an antenna for LF signals.

The LF signal reception antenna 222 includes an LF signal processing circuit for processing a low-frequency signal (LF signal) of 125 [kHz], and receives an LF signal sent from the ECU 250.

The CPU 224 is connected to the LF signal reception antenna 222, the memory 226, and the LF signal transmission antenna 228. The CPU 224 controls overall operation of the smart key 220. The functions of the CPU 224 will be described in detail later.

The memory 226 stores therein data representing a vehicle identification code (ID code) $C_{ID}$, a rolling code R, function formula data D which define a function formula F for renewing the rolling code R, and the number of currently selected function formula data D. In the present embodiment, first function formula data D1, second function formula data D2, and third function formula data D3 which define function formulas F1, F2, F3 as a plurality of function formulas F are stored in the memory 226. The memory 226 also stores therein the number "1" representing the first function formula data D1 as the number of currently selected function formula data D.

The LF signal transmission antenna 228 includes an LF signal generating circuit for generating an LF signal, and sends an LF signal to the ECU 250.

The ECU 250 comprises a door handle sensor 252, a CPU 254, a memory 256, an LF signal transmission antenna 258, an LF signal reception antenna 260, a door lock mechanism 262, and an ignition switch 264.

The door handle sensor 252 detects when the user touches the handle of any one of the doors (not shown), and outputs a signal to the CPU 254.

The CPU 254 is connected to the door handle sensor 252, the memory 256, the LF signal transmission antenna 258, the LF signal reception antenna 260, the door lock mechanism 262, and the ignition switch 264. The CPU 254 controls overall operation of the ECU 250. The functions of the CPU 254 will be described in detail later.

The memory 256 stores therein data representing the vehicle ID code $C_{ID}$, the rolling code R, a plurality of function formula data D which define a plurality of function formulas F for renewing the rolling code R, and the number of currently selected function formula data D. In the present embodiment, first function formula data D1, second function formula data D2, and third function formula data D3 which define function formulas F1, F2, F3 as a plurality of function formulas F are stored in the memory 256. The number "1" representing the first function formula data D1 is stored in the memory 256 as the number of the currently selected function formula data D. The first function formula data D1, the second function formula data D2, the third function formula data D3 which are stored in the memory 256 of the ECU 250 are identical to the first function formula data D1, the second function formula data D2, the third function formula data D3 which are stored in the memory 226 of the smart key 220.

The LF signal transmission antenna 258 includes an LF signal generating circuit for generating an LF signal, and sends an LF signal to the smart key 220.

The LF signal reception antenna 260 includes an LF signal processing circuit for processing an LF signal, and receives an LF signal sent from the smart key 220.

The door lock mechanism 262 locks and unlocks the vehicle doors (not shown) according to a command from the CPU 254.

The ignition switch 264 is a knob switch including a knob 266 having a lock (LOCK) position, an accessory (ACC) position, an ON position, an engine start (START) position. The LOCK position is a position for disabling accessories such as a radio receiver and the engine. The ACC position is a position for starting communications between the ECU 250 and the smart key 220 and unlocking the knob and enabling the accessories if an authentication process is successful between the ECU 250 and the smart key 220. The ON position is a position for continuously enabling an engine 282. The START position is a position for starting the engine 282.

The knob 266 cab be pressed in the LOCK position by the driver, can be turned between the LOCK position and the ACC position by the driver while being pressed (PUSH), can be turned between the ACC position and the ON position by the driver while being not pressed, and can be turned from the ON position to the START position which is a momentary position by the driver while being not pressed. The momentary position means that when the driver releases the fingers from the knob 266 in the START position, the knob 266 returns to the ON position under spring forces.

Actually, in the ON position, a vehicle-mounted battery (not shown) supplies a voltage to a fuel injection controller 280, and thereafter an authentication process is carried out between the CPU 254 and the fuel injection controller 280. When the knob 266 is subsequently turned from the ON position to the START position, the engine 282 is started on the condition that authentication process between the CPU 254 and the fuel injection controller 280 is successful.

Figure 5:
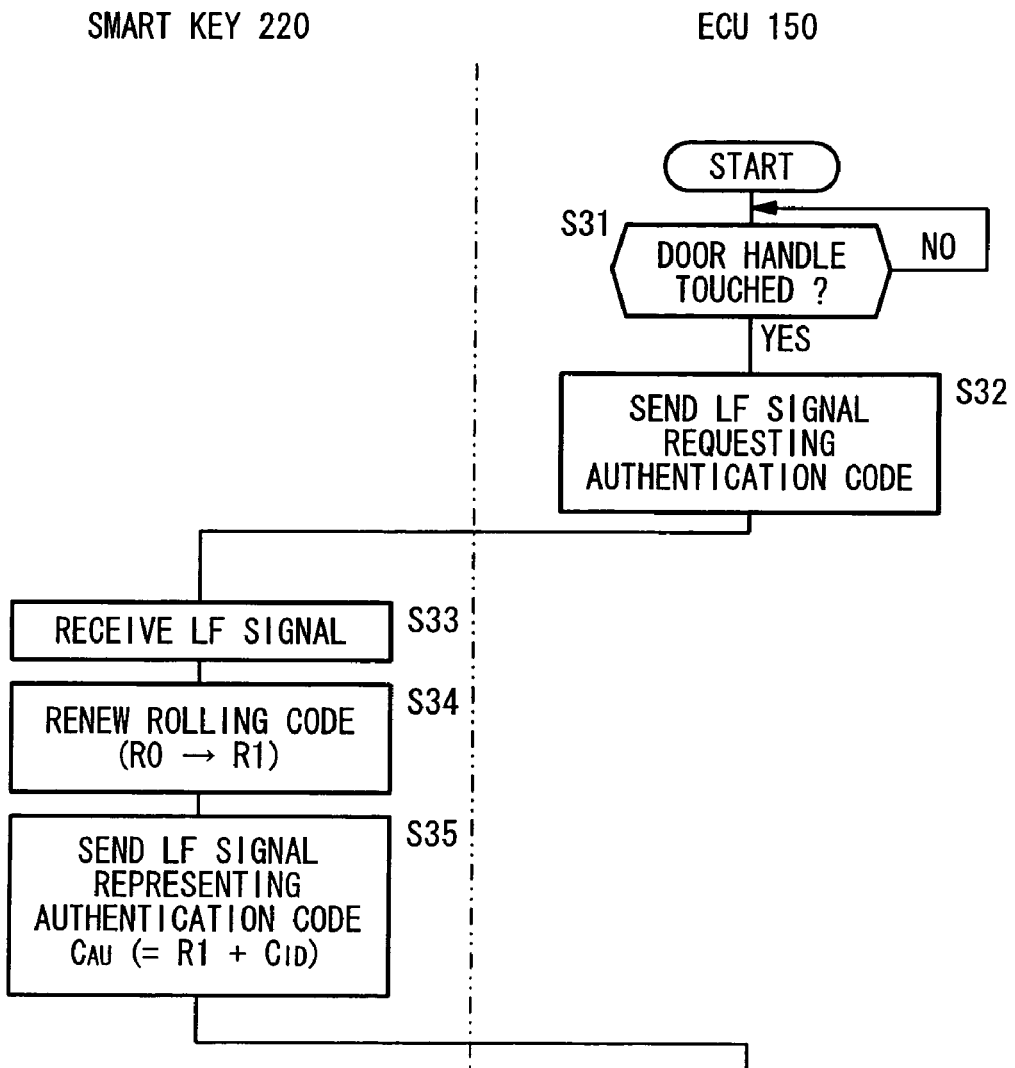
FIG. 5 is a flowchart of a portion of a sequence for unlocking vehicle doors, of the smart key system according to the second embodiment.
Figure 6:
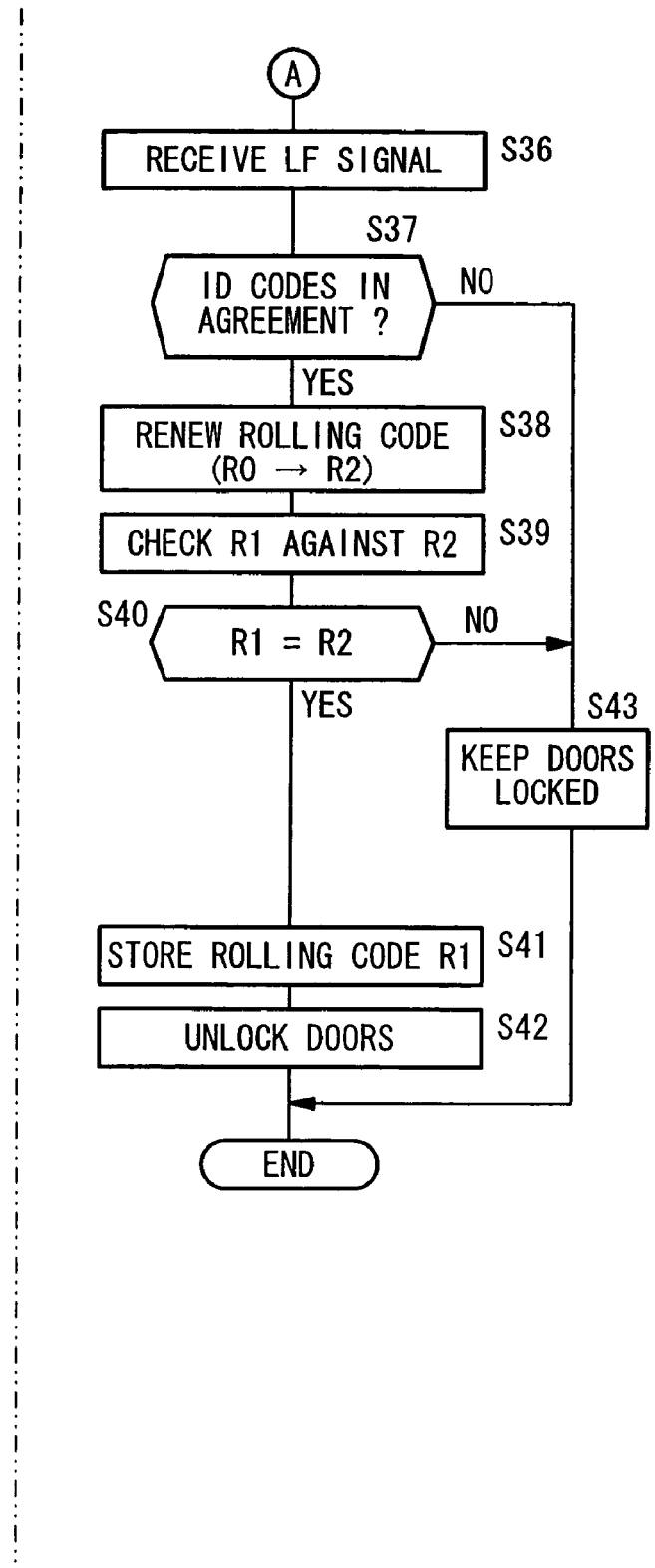
FIG. 6 is a flowchart of the remainder of the sequence for unlocking vehicle doors, of the smart key system according to the second embodiment.

2. Door Unlocking:

FIGS. 5 and 6 show flowcharts of a sequence for unlocking vehicle doors (not shown), of the smart key system 200 according to the second embodiment.

When the user touches a door handle (not shown) of the vehicle in step S31, the CPU 254 sends an LF signal for seeking the transmission of an authentication code $C_{AU}$ that is made up of the identification code (ID code) $C_{ID}$ Of the vehicle and the rolling code R to the smart key 220 through the LF signal transmission antenna 258.

In step S33, the CPU 224 of the smart key 220 receives the LF signal from the ECU 250 through the LF signal reception antenna 222. In step S34, the CPU 224 reads the ID code $C_{ID}$ of the vehicle and the rolling code R (a previously used rolling code R0) from the memory 226, and renews the previous rolling code R0 into a new rolling code R1 according to the function formula F1. The function formula F1 is defined as F1($n$+1)=F1($n$)+1, for example. In other words, each time the LF signal is received from the ECU 250, the value of the rolling code is incremented by 1.

In step S35, the CPU 224 sends an LF signal which represents the authentication code $C_{AU}$ made up of the ID code $C_{ID}$ of the vehicle and the rolling code R1, from the LF signal transmission antenna 228.

In step S36, the LF signal reception antenna 260 of the ECU 250 receives the LF signal sent from the smart key 220. In step S37, the CPU 254 reads the ID code $C_{ID}$ of the vehicle from the LF signal, and checks it against the ID code $C_{ID}$ of the vehicle which is stored in the memory 256. If the ID code $C_{ID}$ of the vehicle included in the LF signal and the ID code $C_{ID}$ stored in the memory 256 are in agreement with each other, then control goes to step S38. If not in agreement with each other, then the CPU 254 finishes its processing sequence in step S43, keeping the doors locked.

In step S38, the CPU 254 renews the rolling code (the previously used rolling code R0) stored in the memory 256 into a new rolling code R2 according to the function formula F1.

In step S39, the CPU 254 checks the rolling code R1 against the rolling code R2. If the rolling code R1 and the rolling code R2 agree with each other in step S40, then the CPU 254 stores the rolling code R1 in the memory 256 in step S41. In step S42, the CPU 254 sends a command to the door lock mechanism 262 to unlock the vehicle doors (not shown). According to the command, the door lock mechanism 262 unlocks the vehicle doors. If the rolling code R1 and the rolling code R2 do not agree with each other in step S40, then the CPU 254 does not send a command to the door lock mechanism 262 to unlock the vehicle doors, which remain locked.

3. Changing of Function Formulas and Start of the Engine:

FIG. 7 is a flowchart of a sequence for changing function formulas F used by the smart key 220 and the ECU 250 and starting the engine.

When the knob 266 of the ignition switch 264 is pressed in step S51, the CPU 254 selects function formula data D other than the first function formula data D1, i.e., the second function formula data D2 or the third function formula data D3 in step S52. It is assumed for illustrative purpose that the CPU 254 selects the second function formula data D2. In step S53, the CPU 254 rewrites the number of the currently selected function formula data D in the memory 256 from the number "1" representing the first function formula data D1 into the number "2" representing the second function formula data D2.

In step S54, the CPU 254 sends the number "2" representing the second function formula data D2 to the smart key 220 through the LF signal transmission antenna 258.

In step S55, the CPU 224 of the smart key 220 receives the number "2" representing the second function formula data D2 sent from the ECU 250 through the LF signal reception antenna 222. In step S56, the CPU 224 rewrites the number of the currently selected function formula data D in the memory 226 from the number "1" representing the first function formula data D1 into the number "2" representing the second function formula data D2.

After step S54, if the knob 266 of the ignition switch 264 is turned from the ON position to the START position in step S57, the ECU 250 carries out an authentication process between the CPU 254 and the fuel injection controller 280 in step S58.

If the authentication process is successful in step S59, the CPU 254 sends a command to the fuel injection controller 280 to start the engine 282, and the fuel injection controller 280 starts the engine 282 in step S60.

If the authentication process fails in step S59, then the CPU 254 does not send a command to the fuel injection controller 280 to start the engine 282, which remains at rest in step S61.

4. Processes of Selecting Function Formula F:

New function formula data D can be selected in step S52 shown in FIG. 7 in the same manner as with the first embodiment. Specifically, new function formula data D can be selected based on random variables, the measured values from measuring instruments on the vehicle, etc.

5. Advantages of the Second Embodiment:

With the smart key system according to the second embodiment, the CPU 224 of the smart key 220 and the CPU 254 of the ECU 250 change the function formula F1 defined by the first function formula data D1 stored in the memory 226 and the function formula F1 defined by the first function formula data D1 stored in the memory 256 to respective new function formulas F2.

With this arrangement, the function formulas F used by the smart key 220 and the ECU 250 can be changed to respective new function formulas F. Therefore, since it is hard to predict the function formulas F used by the smart key 220 and the ECU 250, the security of the smart key system 200 is increased.

The memory 226 of the smart key 220 stores the first function formula data D1, the second function formula data D2, and the third function formula data D3 which define the respective function formulas F1, F2, F3, and the memory 256 of the ECU 250 stores the first function formula data D1, the second function formula data D2, and the third function formula data D3, as is the case with the memory 226. The ECU 250 sends a number indicative of which one of the first function formula data D1, the second function formula data D2, and the third function formula data D3 is to be selected, to the smart key 220, and the smart key 220 selects function formula data D based on the number.

For changing function formulas F in the smart key 220, only a number representing function formula data D, but not the function formula data D themselves, may be transmitted from the ECU 250 to the smart key 220. Accordingly, the amount of data transmitted from the ECU 250 to the smart key 220 is reduced for speeding up communications. As a number representing function formula data D is sent to the smart key 220, the possibility that the content of the function formula data D will leak out is lower than if the function formula data D themselves were sent, so that the security of the smart key system 200 is increased.

C. Applications of the Present Invention

The present invention is not limited to the above embodiments, but may employ various configurational details based on the disclosure of the specification. For example, configurational details (1) through (8) shown below may be employed.

(1) Applicable Systems:

Applicable systems of the present invention have been described as the keyless entry system 100 according to the first embodiment and the smart key system 200 according to the second embodiment. The present invention is not limited to those systems, but is applicable to other systems insofar as they carry out an authentication process between a portable device and a vehicle-mounted authenticating device (vehicle-mounted authenticating means). For example, the present invention is applicable to a system for opening the engine hood or the fuel filler opening based on the result of an authentication process between a portable device and a vehicle-mounted authenticating device.

In the first embodiment, an RF signal and an LF signal are used for communications between the remote control key 120 and the ECU 150, and LF signals are used for communications between the smart key 220 and the ECU 250. However, various signals can also be used.

(2) Authentication Code and Reference Code:

In each of the above embodiments, the authentication code $C_{AU}$ exchanged between the portable device (the remote control key 120, the smart key 220) and the vehicle-mounted authenticating device (the ECUs 150, 250) is composed of a combination of the vehicle ID code $C_{ID}$ and the rolling rod R. However, the authentication code $C_{AU}$ may be of other forms insofar as it can be renewed according to given function formulas. For example, the authentication code $C_{AU}$ may be composed of only the rolling code R free of ID code $C_{ID}$. Alternatively, the authentication code $C_{AU}$ may be composed of the product of the ID code $C_{ID}$ and the rolling code R, as disclosed in Japanese Laid-Open Patent Publication No. 08-102982 and Japanese Laid-Open Patent Publication No. 10-061277.

In each of the above embodiments, both the ID code $C_{ID}$ and the rolling code R are stored in a rewritable nonvolatile memory such as an EEPROM, a flash memory, or the like. However, the ID code $C_{ID}$ may be stored in a non-rewritable nonvolatile memory such as a ROM or the like.

(3) Function Formulas:

In each of the above embodiments, the three function formulas F1, F2, F3 are employed. However, the present invention is not limited to them, but may use a plurality of function formulas insofar as they can be changed.

In each of the above embodiments, furthermore, the function formula F1 is defined as $F1(n+1)=F1(n)+1$, the function formula F2 as $F2(n+1)=F2(n)+100$, and the function formula F3 as $F3(n+1)=F3(n)-50$. However, the present invention is not limited to them, but is applicable to other function formulas insofar as they are different from each other. For example, function formulas may include a multiplication such as $fa(n+1)=fa(n)\times 2$ or a division such as $fb(n+1)=fb(n)+2$. Alternatively, function formulas including a combination of an addition, a subtraction, a multiplication and a division may be used.

A plurality of tables (maps) representing random combinations of the rolling code R1 calculated according to the function formula $F1(n+1)=F1(n)+1$ and character codes may be provided, and function formulas produced by changing the tables may be used.

(4) Checking the Authentication Code Against the Reference Code:

In step S8 (FIG. 2) according to the first embodiment, the RF signal received by the ECU 150 is judged as being sent from the authentic remote control key 120 when any error between the rolling code R1 and the rolling code R2 is in the given range (0 to +10). The error range may be set to any desired range depending on the specifications of the keyless entry system 100.

Similarly, in step S40 (FIG. 6) according to the second embodiment, the LF signal received by the ECU 250 is judged as being sent from the authentic smart key 220 only when the rolling code R1 and the rolling code R2 are in agreement with each other. However, it is possible to establish a certain error depending on the specifications of the smart key system 200.

(5) Processes of Changing Function Formulas:

In each of the above embodiments, the vehicle-mounted authenticating device (the ECUs 150, 250) sends new function formula data D or a number representing new function formula data D to the portable device (the remote control key 120, the smart key 220). Conversely, the portable device may send new function formula data D or a number representing new function formula data D to the vehicle-mounted authenticating device. Alternatively, a device other than the vehicle-mounted authenticating device and the portable device may send new function formula data D or a number representing new function formula data D.

(6) Processes of Renewing Function Formulas:

In the first embodiment, the function formula F used by the remote control key 120 and the ECU 150 is renewed using the function formula data D (the first function formula data D1, the second function formula data D2, the third function formula data D3) stored in the memory 156 of the ECU 150. In the second embodiment, the function formula F used by the smart key 220 and the ECU 250 is renewed using the function formula data D (the first function formula data D1, the second function formula data D2, the third function formula data D3) stored in the memory 226 of the smart key 220 and the memory 256 of the ECU 250. However, the present invention is not limited to such arrangements.

For example, as shown in FIG. 8, an external device 300 may supply new function formula data D. Specifically, a system similar to the keyless entry system 100 shown in FIG. 1 is combined with the external device 300 which stores a plurality of function formula data D therein, making up a keyless entry system 100A. In the keyless entry system 100A, the external device 300 sends an RF signal to the RF signal reception antenna 152. The RF signal includes information of new function formula data D. When the ECU 150 receives the RF signal from the external device 300, it stores the RF signal in the memory 156. The ECU 150 selects the function formula data D received from the external device 300 as function formula data D to be subsequently used, and also supplies the function formula data D to the remote control key 120.

It is thus possible to renew, from outside of the vehicle, the function formula data D stored in the memory 156 of the ECU 150 and the function formula data D stored in the memory 126 of the remote control key 120 based on the function formula data D newly stored in the memory 156 of the ECU 150. Therefore, the function formula data D stored in the memories 126, 156 can easily be renewed for making the keyless entry system 100A more secure.

In the first embodiment, function formula data D are changed when the driver turns the remote control key 120 to start the engine (YES in step S21 in FIG. 3). In the second embodiment, function formula data D are changed when the driver presses the knob 266 of the ignition switch 264 (YES in step S51 in FIG. 7). However, the timing to change function formula data D is not limited to those timings. For example, function formula data D may be changed when the knob 266 of the ignition switch 264 is returned from the ON position or the ACC position to the LOCK position.

(7) Processes of Selecting Function Formula Data:

In each of the above embodiments, function formula data D are selected based on random variables and the measured values from measuring instruments on the vehicle. However, the present invention is not limited to the above processes, but may employ other processes insofar as they can be used to select function formula data D. For example, function formula data D may be selected based on the remainder of a division performed on a checksum of a signal sent from the vehicle-mounted authenticating device or the portable device.

(8) Others:

It is preferable that the function formula data stored in each of the memories be capable of reverting to a default setting from outside. For example, the function formula data can revert to a default setting when a predetermined voltage is applied from outside to a given terminal.

In each of the above embodiments, at least one of the memories of the portable device and the vehicle-mounted authenticating device stores a plurality of function formula data D. However, when vehicle theft prevention systems are manufactured, a memory of the manufacturing apparatus may store a plurality of function formula data D, and one of the stored function formula data D may be selected for each of the vehicle theft prevention systems for increasing the security of the vehicle theft prevention systems. In other words, when a plurality of vehicle theft prevention systems are manufactured for installation on vehicles of one type, the manufacturing apparatus are set to use different function formulas F respectively for the vehicle theft prevention systems, for thereby making it hard to determine the function formulas F used for communications between the portable device and the vehicle-mounted authenticating device, and hence to reduce the possibility that the vehicles will be stolen.

The invention claimed is:

1. A vehicle theft prevention system comprising:
a portable device for sending an authentication code renewed by a first function formula including at least any one arithmetic expression of addition, subtraction, multiplication, and division, the portable device having a first storage unit for storing the authentication code and first function formula data defining the first function formula for renewing the authentication code;
a vehicle-mounted authenticating device for receiving the authentication code, checking the authentication code against a reference code, and controlling operation of vehicle-mounted equipment depending on a result of the check;
wherein the vehicle-mounted authenticating device has a second storage unit for storing the reference code and second function formula data defining a second function formula for renewing the reference code, the second function formula being identical to the first function formula and including at least any one arithmetic expression of addition, subtraction, multiplication and division, and checks the received authentication code against the reference code renewed by the second function formula;
a function formula changing unit for changing the first function formula defined by the first function formula data stored in the first storage unit to a new first function formula and changing the second function formula defined by the second function formula data stored in the second storage unit to a new second function formula, wherein the first storage unit stores a plurality of first function formula data defining a plurality of first function formulas which are different from each other;
the second storage unit stores a plurality of second function formula data defining a plurality of second function formulas which are identical to the plurality of first function formulas defined by the plurality of first function formula data;
the vehicle-mounted authenticating device sends an identifier indicative of which one of the plurality of first function formula data is to be selected to the portable unit;
the portable unit selects the first function formula data based on the identifier;
the changed new first function formula and second function formula are selected based on an output from one of a battery voltmeter, a gasoline level meter, an odometer, and a seat position sensor on the vehicle.

2. A vehicle theft prevention system according to claim 1, further comprising an ignition switch having at least a start position for starting a vehicle engine and a lock position for disabling engine operation,
wherein the vehicle-mounted authenticating device sends the identifier to the portable unit at the time the ignition switch is operated.

3. A vehicle theft prevention system comprising:
a portable device for sending an authentication code renewed by a first function formula including at least any one arithmetic expression of addition, subtraction, multiplication, and division, the portable device having a first storage unit for storing the authentication code and first function formula data defining the first function formula for renewing the authentication code;
a vehicle-mounted authenticating device for receiving the authentication code, checking the authentication code against a reference code, and controlling operation of vehicle-mounted equipment depending on a result of the check;
wherein the vehicle-mounted authenticating device has a second storage unit for storing the reference code and second function formula data defining a second function formula for renewing the reference code, the second function formula being identical to the first function formula and including at least any one arithmetic expression of addition, subtraction, multiplication and division, and checks the received authentication code against the reference code renewed by the second function formula;
a function formula changing unit for changing the first function formula defined by the first function formula data stored in the first storage unit to a new first function formula and changing the second function formula defined by the second function formula data stored in the second storage unit to a new second function formula,
the first storage unit stores only one of the first function formula data defining the first function formula;
the second storage unit stores a plurality of second function formula data defining a plurality of second function formulas which are different from each other;
the vehicle-mounted authenticating device reads second function formula data defining a new second function formula which is different from the first function formula defined by the first function formula data stored in the first storage unit, from the second storage unit, and sends the second function formula data to the portable device;
the portable device stores the received second function formula data as new first function formula data, and uses a new first function formula defined by the new first function formula data for a next renewal of the authentication code; and
the changed new first function formula and second function formula are selected based on an output from one of a battery voltmeter, a gasoline level meter, an odometer, and a seat position sensor on the vehicle.

4. A vehicle theft prevention system according to claim 3, further comprising a new second function formula data supply unit, disposed outside of the vehicle, for supplying new second function formula data defining a new second function formula to the second storage unit of the vehicle-mounted authenticating device by way of wireless communications.

5. A vehicle theft prevention system according to claim 3, further comprising an ignition switch having at least a start position for starting a vehicle engine and a lock position for disabling engine operation,
wherein the vehicle-mounted authenticating device sends the second function formula data defining the new second function formula to the portable unit at the time the ignition switch is operated.

* * * * *